G. B. Wiseman.
Imp.d Stove-Pipe Damper.
Nº 72437.   Patented Dec. 17, 1867.

Witnesses.
Edward Jewett
D. B. ...

Inventor.
G. B. Wiseman
By his att'y
C. D. Smith
451 Seventh St.

United States Patent Office.

GAIUS B. WISEMAN, OF SYCAMORE, ILLINOIS.

*Letters Patent No. 72,437, dated December 17, 1867.*

STOVE-PIPE DAMPER.

*The Schedule referred to in these Letters Patent and making part of the same.*

TO ALL WHOM IT MAY CONCERN:

Be it known that I, GAIUS B. WISEMAN, of Sycamore, in the county of De Kalb, and State of Illinois, have invented a new and useful Improvement in Dampers for Stove-Pipes, &c.; and I do hereby declare the following to be a full, clear, and exact description of the same, reference being had to the accompanying drawings, in which—

My invention consists in a new and useful improvement in the construction of dampers for stove-pipes, &c., whereby they may be retained in any one of three positions, as may be desired, beyond the possibility of being moved by the draught, and without the use of any springs or screws to wear out or get out of order, there being, in fact, no more parts than in the simplest form of damper known.

Figure 1:
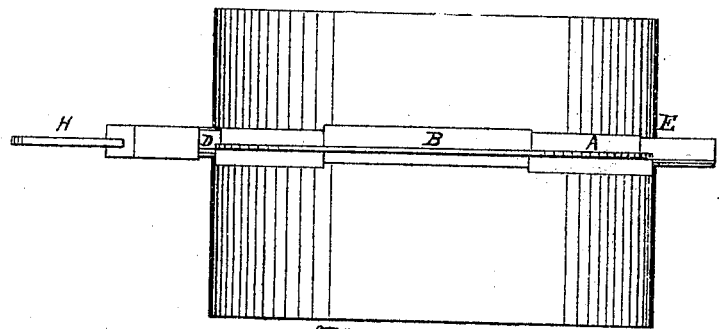
Figure 1 shows a section of pipe with the damper in position.
Figure 2:
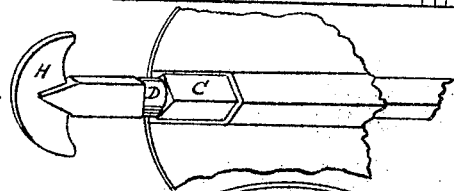
Figure 2 is a perspective view of damper-rod.
Figure 3:
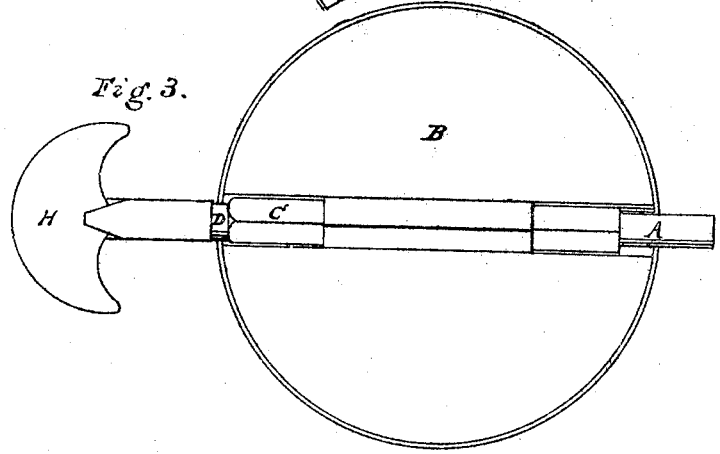
Figure 3 is a plan of valve and valve-rod.
Figure 4:
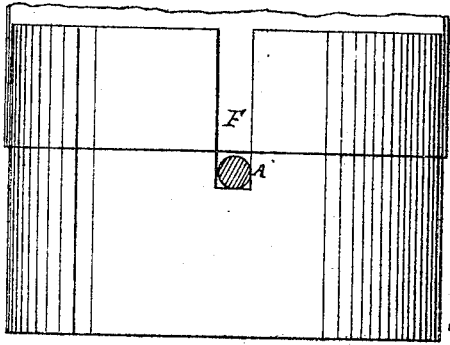
Figure 4 is an elevation of pipe showing slot for damper-rod.

The damper-plate B is of sheet, or it may be of cast iron, of circular form, and of size to fit the aperture of the pipe, and has the rod A passing through it in the usual manner, but so loosely that the rod may be at liberty to slide freely, but without turning within it. The rod of the damper is made of the form represented at fig. 3, and is of iron or other metal. It passes through the pipe at opposite points in its circumference, and has the damper-plate upon it within the pipe, the two ends projecting outwards from the pipe, one forming the handle by which the whole is turned. Beginning with the handle H, and supposing it to be horizontal, the rod is square to the point D, where the corners are cut away, leaving it cylindrical and of the same diameter as the side of the rod beyond the pipe for a distance equal to a little more than the thickness of the two sheets at the joint of the pipe. Then the rod is made square again, but the sides of the same are not in the same plane as the sides of the square portion before mentioned, the diagonal of one being perpendicular to the side of the other. This square portion of the rod is continued to the other side of the pipe, where it again becomes cylindrical and passes through a circular opening of sufficient size, in which it may turn freely. This circular end passes beyond the pipe a little way, in order that it may be drawn out or in a limited distance, as is necessary in using the damper. On two sides of the square portion of the rod, at C, are slight projections, so placed as to prevent the rod from being drawn out of the pipe when it may be turned so as to bring this square portion of the rod in the slot of the pipe.

The damper is placed in the pipe at any suitable joint of the same, by making a slot in one side of the pipe wide enough to receive the square portion of the rod, and a circular opening to receive the other end in an opposite point of its circumference. The lap of the succeeding joint of pipe covers the slot, except so much of its lower end as is required for the rod of the damper.

The manner of using the damper is as follows: Having placed the rod A through the damper-plate B, so that the handle and plate are in the same plane, the circular end of the rod is placed in the circular opening at E, and the part on which the handle is in the slot at F, then the different joints of pipe are connected together, and the damper is secured between them. When the damper is in place, the rod may be pushed in or withdrawn a limited distance, and when the cylindrical portion D is within the slot it may be revolved. The square portions A and C, when drawn within the slot, prevent the damper from turning, and by their use it may be "set" entirely open, entirely closed, or at an angle of forty-five degrees. When it is desired to cut off the draught, the rod A is pushed in until the square portion of the same rests in the slot at F; then it cannot be turned. And if all the draught is desired, it is drawn out, so as to bring the circular portion of the rod in the slot F, when it is free to turn to any position; and by pushing in the square portion, when turned one-fourth of the way round, it is retained in that position. Should less draught be desired, bring the circular portion in the slot P and draw out the rod, when the inner square portion of the rod will be brought into the slot F and the damper retained in this position.

Having thus described my invention, what I claim as new, and desire to secure by Letters Patent of the United States, is—

A damper, B, provided with a sliding rod which has a cylindrical and two or more rectangular portions, constructed substantially as and operating in the manner set forth.

GAIUS B. WISEMAN.

Witnesses:
GEORGE H. SMITH.
LOUIS CONNART.